United States Patent
Luo et al.

(10) Patent No.: US 12,263,757 B2
(45) Date of Patent: Apr. 1, 2025

(54) BATTERY EQUALIZATION SYSTEM AND METHODS OF USING SAME INCLUDING FIRST AND SECOND POWER SUPPLY BRANCH CIRCUITS

(71) Applicant: BYD COMPANY LIMITED, Guangdong (CN)

(72) Inventors: Hongbin Luo, Shenzhen (CN); Chao Wang, Shenzhen (CN); Xiaofeng Shen, Shenzhen (CN); Qiuyong Zeng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/338,936

(22) Filed: Jun. 21, 2023

(65) Prior Publication Data

US 2023/0356626 A1    Nov. 9, 2023

Related U.S. Application Data

(63) Continuation of application No. 16/642,718, filed as application No. PCT/CN2018/103683 on Aug. 31, 2018, now abandoned.

(30) Foreign Application Priority Data

Aug. 31, 2017    (CN) .......................... 201710773473.9

(51) Int. Cl.
*B60L 58/22* (2019.01)
*B60L 58/18* (2019.01)
(Continued)

(52) U.S. Cl.
CPC .............. *B60L 58/22* (2019.02); *B60L 58/18* (2019.02); *B60L 58/20* (2019.02); *H02J 7/00* (2013.01);
(Continued)

(58) Field of Classification Search
CPC .......... B60L 58/22; B60L 58/18; B60L 58/20; H02J 7/00; H02J 7/0013; H02J 7/0014; H02J 7/0016; H02J 7/0019; H02J 7/0047
(Continued)

(56) References Cited

U.S. PATENT DOCUMENTS 8,917,061 B2 * 12/2014 Zhu .................... H02J 7/0016
                                                    320/122
10,396,570 B2    8/2019 Loncarevic
(Continued)

FOREIGN PATENT DOCUMENTS

CN        201478865 U    5/2010
CN        102148521 A    8/2011
(Continued)

OTHER PUBLICATIONS

Search Report for International Application No. PCT/CN2018/103683 dated Nov. 21, 2018.

*Primary Examiner* — Richard Isla
*Assistant Examiner* — Manuel Hernandez
(74) *Attorney, Agent, or Firm* — Calfee, Halter & Griswold LLP

(57) ABSTRACT

A battery equalization system, a vehicle, a battery equalization method, and a storage medium. The battery equalization system includes: a collection circuit; and equalization circuit; a controller, connected to the collection circuit and the equalization circuit; and a power supply branch circuit, controlled by the controller to get connected to a power supply unit and the battery equalization system when a vehicle is in an OFF gear and a cell needs enabling of equalization, so that the power supply unit supplies power to the battery equalization system.

16 Claims, 6 Drawing Sheets

(51) Int. Cl.
*B60L 58/20* (2019.01)
*H02J 7/00* (2006.01)

(52) U.S. Cl.
CPC .......... *H02J 7/0013* (2013.01); *H02J 7/0014* (2013.01); *H02J 7/0016* (2013.01); *H02J 7/0019* (2013.01); *H02J 7/0047* (2013.01)

(58) Field of Classification Search
USPC .......................................................... 320/118
See application file for complete search history.

(56) References Cited

U.S. PATENT DOCUMENTS

| | | | |
|---|---|---|---|
| 2001/0054877 A1 | 12/2001 | Kinoshita | |
| 2004/0217736 A1 | 11/2004 | Bischoff | |
| 2006/0119319 A1 | 6/2006 | Sakurai | |
| 2006/0158201 A1 | 7/2006 | Sobue | |
| 2006/0214636 A1 | 9/2006 | Arai | |
| 2008/0211459 A1 | 9/2008 | Choi | |
| 2009/0167248 A1 | 7/2009 | Murao | |
| 2009/0250277 A1 | 10/2009 | Grand | |
| 2010/0259221 A1 | 10/2010 | Tabatowski-Bush | |
| 2010/0327808 A1 | 12/2010 | Matsuura | |
| 2011/0006734 A1 | 1/2011 | Kirimoto | |
| 2011/0025125 A1* | 2/2011 | Brabec | H02J 7/0071 307/9.1 |
| 2011/0050169 A1* | 3/2011 | Akiba | B60L 53/305 320/109 |
| 2011/0074354 A1 | 3/2011 | Yano | |
| 2012/0074898 A1 | 3/2012 | Schwartz | |
| 2012/0139495 A1 | 6/2012 | Nortman | |
| 2012/0306266 A1 | 12/2012 | Ohnuki | |
| 2012/0313439 A1* | 12/2012 | Yamaguchi | H02J 7/0016 307/71 |
| 2013/0002202 A1 | 1/2013 | Kuraishi | |
| 2013/0030618 A1 | 1/2013 | Blakemore | |
| 2013/0057219 A1 | 3/2013 | Sakata | |
| 2013/0069596 A1 | 3/2013 | Ochiai | |
| 2013/0099743 A1 | 4/2013 | Shimizu | |
| 2013/0106354 A1 | 5/2013 | Suzuki | |
| 2013/0113432 A1 | 5/2013 | Suzuki | |
| 2013/0141048 A1 | 9/2013 | Huang et al. | |
| 2014/0062383 A1 | 3/2014 | Yun et al. | |
| 2014/0111160 A1 | 4/2014 | Nozawa | |
| 2015/0002096 A1 | 1/2015 | Suzuki | |
| 2015/0035487 A1 | 2/2015 | Kawamoto | |
| 2015/0069960 A1 | 3/2015 | Kuraishi | |
| 2015/0077060 A1 | 3/2015 | Okuda | |
| 2017/0366005 A1 | 12/2017 | Isshiki | |
| 2017/0366018 A1* | 12/2017 | Von Novak | H02J 7/0016 |
| 2018/0248386 A1* | 8/2018 | Hale | H02J 7/0014 |
| 2019/0074699 A1* | 3/2019 | Yano | H02J 1/102 |
| 2019/0229518 A1 | 7/2019 | Ronne | |
| 2019/0285669 A1* | 9/2019 | Furukawa | H01M 10/48 |
| 2020/0346552 A1 | 11/2020 | Luo | |
| 2020/0346558 A1 | 11/2020 | Luo | |
| 2021/0351597 A1* | 11/2021 | Yang | H02J 7/0063 |

FOREIGN PATENT DOCUMENTS

| | | |
|---|---|---|
| CN | 102457078 A | 5/2012 |
| CN | 102496979 A | 6/2012 |
| CN | 102782980 A | 11/2012 |
| CN | 102918738 | 2/2013 |
| CN | 102969772 A | 3/2013 |
| CN | 103166257 A | 6/2013 |
| CN | 103199587 A | 7/2013 |
| CN | 103378618 A | 10/2013 |
| CN | 103551857 A | 1/2014 |
| CN | 103683341 A | 3/2014 |
| CN | 103701171 A | 4/2014 |
| CN | 104079016 | 10/2014 |
| CN | 104106175 A | 10/2014 |
| CN | 105711434 A | 6/2016 |
| CN | 106143159 A | 11/2016 |
| CN | 106143159 B | 11/2016 |
| CN | 205945121 U | 2/2017 |
| CN | 106549454 A | 3/2017 |
| CN | 106602668 A | 4/2017 |
| CN | 207241459 U | 4/2018 |
| EP | 2538522 A1 | 12/2012 |
| EP | 2582010 A1 | 4/2013 |
| JP | 2003189490 A | 7/2003 |
| JP | 2007325458 A | 12/2007 |
| JP | 2008054416 A * | 3/2008 |
| JP | 2009148127 A | 7/2009 |
| JP | 2009158486 A | 7/2009 |
| JP | 5316709 B2 | 10/2013 |
| KR | 20130007613 S | 1/2013 |
| TW | 201138260 A1 | 11/2011 |
| WO | 2011102458 A1 | 8/2011 |
| WO | 2011155034 A1 | 12/2011 |

\* cited by examiner

BATTERY EQUALIZATION SYSTEM AND METHODS OF USING SAME INCLUDING FIRST AND SECOND POWER SUPPLY BRANCH CIRCUITS

CROSS-REFERENCE TO RELATED APPLICATIONS

The present application is a continuation of U.S. patent application Ser. No. 16/642,718, filed on Feb. 27, 2020, which is based on International Application No. PCT/CN2018/103683, filed on Aug. 31, 2018, and claims priority to Chinese Patent Application No. 201710773473.9, filed on Aug. 31, 2017, which are incorporated herein by reference in their entireties.

FIELD

The present application relates to the battery pack equalization field, and in particular, to a battery equalization system, a vehicle, a battery equalization method, and a storage medium.

BACKGROUND

A power battery pack is an important part of an electric vehicle. A battery pack is multiple cells connected in series. While a battery is in use, the difference between the cells in the battery pack gradually increases, resulting in poor consistency between the battery cells. Due to the short slab effect of the battery, the capacity of a battery pack cannot be brought into full play, thereby decreasing the overall capacity of the battery pack. Therefore, managing equalization of the power battery pack of an electric vehicle effectively is helpful to improve the consistency between the cells in the power battery pack, reduce the capacity loss of the battery, and extend the battery life and the mileage of the electric vehicle, and is of great significance.

In the practical application of related equalization technologies, main operations in a battery charging and discharging process are to collect battery information, determine whether equalization needs to be enabled for the battery and whether equalization processing needs to be performed for the battery, in which equalization efficiency is low and equalization time is long.

SUMMARY

The objective of the present application is to provide a battery equalization system, a vehicle, a battery equalization method, and a storage medium to resolve the technical problem of low equalization efficiency of a battery equalization system in the related art.

To achieve the above objective, the present application provides a battery equalization system, including:
 a collection circuit, configured to collect parameter information of cells in a battery pack;
 an equalization circuit, configured to perform equalization processing on the cells in the battery pack;
 a controller, connected to the collection circuit and the equalization circuit separately, and configured to: when it is determined, according to the parameter information of the cells in the battery pack, that a cell in the battery pack needs enabling of equalization, control the equalization circuit to perform equalization processing on the cell that needs enabling of equalization; and
 a power supply branch circuit, controlled by the controller to get connected to a power supply unit and the battery equalization system when a vehicle is in an OFF gear and a cell needs enabling of equalization, so that the power supply unit supplies power to the battery equalization system.

Optionally, the power supply branch circuit includes a first power supply branch circuit and a second power supply branch circuit.

The first power supply branch circuit is connected to the power supply unit and the battery equalization system, and the first power supply branch circuit is configured to supply power to the battery equalization system and loads of the entire vehicle except the battery equalization system.

The second power supply branch circuit is connected to the power supply unit and the battery equalization system, and the second power supply branch circuit is configured to supply power to the battery equalization system.

When the vehicle is in the OFF gear and a cell needs enabling of equalization, the second power supply branch circuit is in a connected state, and the first power supply branch circuit is in a disconnected state under the control of a vehicle body controller.

Optionally, connection and disconnection of the first power supply branch circuit and the second power supply branch circuit are controlled by a switch.

Optionally, a second switch and a first switch that is controlled by the vehicle body controller are separately disposed on the second power supply branch circuit and the first power supply branch circuit; two sides of the second switch are respectively connected to the power supply unit and the controller; one side of the first switch is connected to the power supply unit, and the other side of the first switch is connected to the controller and a load.

Optionally, the second switch is controlled by the vehicle body controller; when the vehicle is in the OFF gear and a cell needs enabling of equalization, the controller transmits an equalization request to the vehicle body controller so that the vehicle body controller controls the second switch and the first switch to stay in a connected state and a disconnected state respectively.

Optionally, when the vehicle is in the OFF gear and after the equalization circuit ends the equalization processing on the cell that needs enabling of equalization, the controller transmits an equalization end request to the vehicle body controller so that the vehicle body controller controls the second switch to stay in a disconnected state.

Optionally, the second switch is controlled by the controller; when the vehicle is in the OFF gear and a cell needs enabling of equalization, the controller controls the second switch to get connected, and after the second power supply branch circuit is connected, the vehicle body controller controls the first switch to disconnect.

Optionally, when the vehicle is in the OFF gear and after the equalization circuit ends the equalization processing on the cell that needs enabling of equalization, the controller controls the second switch to stay in a disconnected state.

Optionally, after the vehicle is powered on, the second switch is in a connected state under the control of the controller or the vehicle body controller.

Optionally, further including a third power supply branch circuit, one end of the third power supply branch circuit is connected to the controller, and the other end of the third power supply branch circuit is connected to the collection circuit and the equalization circuit.

Optionally, the controller is respectively connected through two channels to the collection circuit and the equalization circuit that correspond to a same cell.

Optionally, the controller includes a control chip, and the control chip is respectively connected through two pins to the collection circuit and the equalization circuit that correspond to the same cell, the two pins are in one-to-one correspondence to the two channels, one of the two pins is connected to the equalization circuit through one of the two channels, and the other of the two pins is connected to the collection circuit through the other of the two channels.

Optionally, the controller is connected through one channel to the collection circuit and the equalization circuit that correspond to a same cell, and the collection circuit and the equalization circuit multiplex the channel in a time division manner.

Optionally, the controller includes a control chip, the control chip is connected through one pin to the collection circuit and the equalization circuit that correspond to the same cell, and the pin is connected to the equalization circuit and the collection circuit through the channel.

Optionally, the controller is further configured to: when it is determined, according to the parameter information of the battery pack, that a cell in the battery pack needs enabling of equalization, obtain a target equalization duration of the cell that needs enabling of equalization, and control, according to the target equalization duration of the cell that needs enabling of equalization, the equalization circuit to discharge the cell that needs enabling of equalization.

The present application further provides a vehicle, including the battery equalization system.

The present application further provides a battery equalization method, applied to a vehicle having a storage battery. The vehicle includes the battery equalization system, and the battery equalization method includes:

collecting, by a collection circuit, parameter information of cells in a battery pack;
  controlling, when it is determined, according to the parameter information of the cells in the battery pack, that a cell in the battery pack needs enabling of equalization and that the vehicle is in an OFF gear, a power supply branch circuit to get connected to a power supply unit and the battery equalization system, so that the power supply unit supplies power to the battery equalization system; and
  controlling, by a controller, an equalization circuit to perform equalization processing on the cell that needs enabling of equalization.

The battery equalization system further includes a first power supply branch circuit connected to the power supply unit and the battery equalization system, and a second power supply branch circuit connected to the power supply unit and the battery equalization system;

The controlling a power supply branch circuit to get connected to a power supply unit and the battery equalization system includes:

controlling the second power supply branch circuit to stay in a connected state; and
  changing, by a vehicle body controller after the second power supply branch circuit is connected, the first power supply branch circuit from a connected state to a disconnected state.

Optionally, the controlling the second power supply branch circuit to stay in a connected state includes:

transmitting, by the controller, an equalization request to the vehicle body controller; and
  controlling, by the vehicle body controller after receiving the equalization request, the second power supply branch circuit to stay in a connected state.

Optionally, the method further includes:

confirming, by the controller, that the equalization circuit ends the equalization processing on the cell that needs enabling of equalization;
  transmitting, by the controller, an equalization end request to the vehicle body controller; and
  controlling, by the vehicle body controller after receiving the equalization end request, the second power supply branch circuit to stay in a disconnected state.

The technical solutions provided in the embodiments of the present application may include the following beneficial effects:

The present application improves the electrical connection structure of the battery equalization system. When the entire vehicle is in the OFF gear and a cell in the battery pack needs enabling of equalization, by controlling the power supply branch circuit connected to the power supply unit and the battery equalization system to stay in the connected state, the present application enables the power supply unit to supply power to the battery equalization system when the entire vehicle is in the OFF gear. Further, the controller can continue to control the equalization circuit to perform equalization processing on the cell that needs enabling of equalization, thereby extending the battery equalization time, improving the battery equalization effect, and resolving the technical problem of low equalization efficiency of the battery equalization system in the related art.

Other features and advantages of the present application will be described in detail in the following detailed description.

BRIEF DESCRIPTION OF THE DRAWINGS

The accompanying drawings are used to provide a further understanding of the present application, constitute a part of the specification, are used to explain the present application together with the following specific implementations, but do not constitute a limitation on the present application. In the accompanying drawings.

DETAILED DESCRIPTION

The specific implementations of the present application will be described in detail below with reference to the accompanying drawings. It should be understood that, the specific implementations described herein are only used to illustrate and explain the present application, and are not intended to limit the present application.

Figure 1:
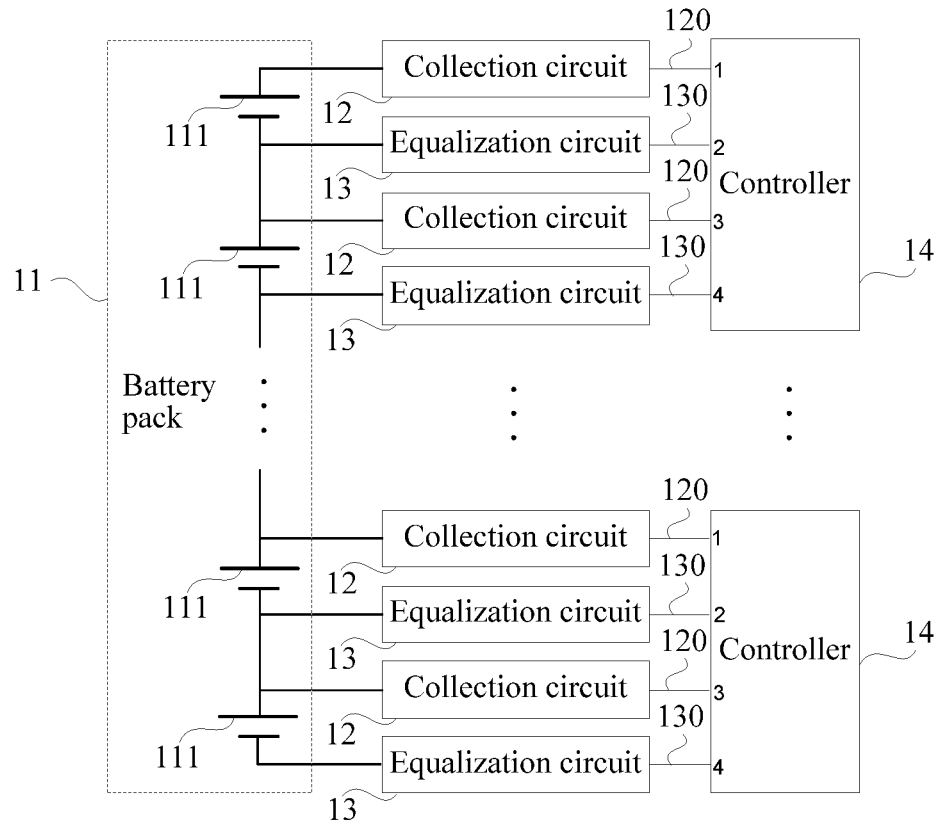
FIG. 1 is a block diagram of a battery equalization system according to an exemplary embodiment.
Figure 2:
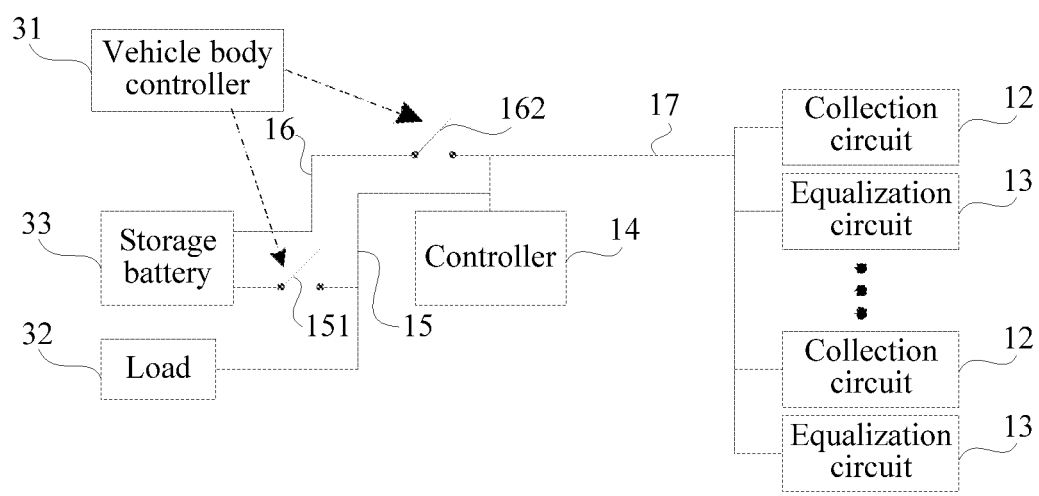
FIG. 2 is a schematic diagram of a power supply branch circuit in a battery equalization system according to an exemplary embodiment.

FIG. 1 is a block diagram of a battery equalization system according to an exemplary embodiment; and FIG. 2 is a schematic diagram of a power supply branch circuit in a battery equalization system according to an exemplary embodiment. As shown in FIG. 1 and FIG. 2, the battery equalization system is applied to a vehicle that includes a vehicle body controller 31 and a storage battery 33. The battery equalization system includes a collection circuit 12, an equalization circuit 13, a controller 14, and a power supply branch circuit. The battery pack 11 is multiple cells 111 connected in series, and the power supply unit may be a storage battery 33. The storage battery 33 is a start-up battery and is used to supply power to low-voltage components of the entire vehicle.

In FIG. 1, the controller 14 is respectively connected to each cell 111 through two channels 120, 130 to the collection circuit 12 and the equalization circuit 13 of the same cell 111 in a one-to-one correspondence. The controller 14 includes a control chip, and the control chip is respectively connected to each cell 111 through two pins (represented by numerals 1-4) to the collection circuit 12 and the equalization circuit 13 that correspond to the same cell 111. For each cell, the two pins (e.g., pins 1 and 2 for a first cell 111, and pins 3 and 4 for a second cell 111) are in one-to-one correspondence to the two channels 120, 130. One of the two pins (e.g., pins 2 and 4) is connected to the equalization circuit 13 through the channel 130, and the other of the two pins (e.g., pins 1 and 3) is connected to the collection circuit 12 through the channel 120.

As shown in FIG. 1, the collection circuit 12 is configured to collect parameter information of the cell 111 in the battery pack 11, and transmit the collected parameter information of the battery pack to the controller 14. The cell 111 in the battery pack 11 is in one-to-one correspondence to the collection circuit 12. The parameter information includes information such as battery voltage and temperature. By controlling the channel 120 to get connected, the controller 14 controls the collection circuit 12 to collect the parameter information of the battery pack 11.

As shown in FIG. 1 and FIG. 2, the equalization circuit 13 is configured to perform equalization processing on the cell 111 in the battery pack 11, and the cell 111 in the battery pack 11 is in one-to-one correspondence to the equalization circuit 13. When a cell 111 in the battery pack 11 needs to be equalized, the channel 130 between the equalization circuit 13 and the controller 14 is connected, so that the equalization circuit 13 can perform equalization processing on the cell 111 that needs to be equalized.

As shown in FIG. 1 and FIG. 2, the controller 14 is configured to: when it is determined, according to the parameter information of the cell 111 in the battery pack 11, that a cell 111 in the battery pack 11 needs enabling of equalization, control the corresponding channel 130 to get connected, and control the equalization circuit 13 to perform equalization processing on the cell 111 that needs to be equalized.

To enable the battery pack 11 to still be equalized when the battery pack 11 stops discharging or charging (that is, when the entire vehicle is in the OFF gear), the controller 14 is configured to: when the vehicle is in the OFF gear and a cell 111 needs enabling of equalization, control the power supply branch circuit to get connected to the power supply unit and the battery equalization system, so that the power supply unit supplies power to the battery equalization system.

Referring to FIG. 2, the power supply unit is a storage battery 33, and the power supply branch circuit includes a first power supply branch circuit 15 and a second power supply branch circuit 16. One end of the first power supply branch circuit 15 is connected to the storage battery 33, and the other end is separately connected to the controller 14 and a load 32. One end of the second power supply branch circuit 16 is connected to the storage battery 33, and the other end is connected to the controller 14.

The first power supply branch circuit 15 is controlled by the vehicle body controller 31, and the second power supply branch circuit 16 is controlled by the vehicle body controller 31 or the controller 14. In FIG. 2, the second power supply branch circuit 16 is controlled by the vehicle body controller 31. While the battery pack 11 is being discharged or charged, that is, when the entire vehicle is in a non-OFF gear, the first power supply branch circuit 15 may be in a connected state under the control of the vehicle body controller 31. At this time, the storage battery 33 supplies power to the controller 14 through the first power supply branch circuit 15 to maintain the power required by the controller 14. Because both the collection circuit 12 and the equalization circuit 13 are connected to the controller 14, when the storage battery 33 supplies power to the controller 14, the storage battery 33 can also supply power to the collection circuit 12 and the equalization circuit 13.

As shown in FIG. 1 and FIG. 2, when the vehicle is in the OFF gear, the vehicle body controller 31 needs to transmit a power-off notification signal to the first power supply branch circuit 15 to control the controller 14 and the load 32 to power off. When the vehicle is in the OFF gear and the controller 14 determines, according to the parameter information of the cell 111 in the battery pack 11, that a cell 111 in the battery pack 11 needs enabling of equalization, the controller 14 still cannot be powered off. At this time, the vehicle body controller 31 may control the second power supply branch circuit 16 to stay in the connected state. Further, the storage battery 33 can supply power to the controller 14 through the second power supply branch circuit 16 to maintain the power required by the controller 14. After the second power supply branch circuit 16 is connected, the vehicle body controller 31 controls the first power supply branch circuit 15 to stay in a disconnected state so that the load 32 except the battery equalization system is powered off.

Optionally, when the entire vehicle is in the non-OFF gear, if the controller 14 determines, according to the parameter information of the cell 111 in the battery pack 11, that a cell 111 in the battery pack 11 needs enabling of equalization, the vehicle body controller 31 may control either the first power supply branch circuit 15 or the second power supply branch circuit 16 to stay in the connected state. Further, the storage battery 33 can supply power to the controller 14 to maintain the power required by the controller 14.

As shown in FIG. 1 and FIG. 2, when the battery equalization system performs equalization processing on the cell in a passive equalization manner, that is, discharges the cell that needs enabling of equalization, the controller 14 may determine, in the following way, the cell 111 that needs enabling of equalization:

First, according to the voltage value of each cell 111 in the battery pack 11 that is collected by the collection circuit 12, the smallest voltage value among the voltage values of the cells 111 in the battery pack 11 is used as a reference voltage value;

Then, according to a voltage difference between the voltage value of each cell 111 in the battery pack 11 and the reference voltage value, it is determined that the cell 111 whose voltage difference is greater than or equal to a preset voltage difference threshold is the cell 111 that needs enabling of equalization.

Certainly, in other embodiments, the cell that needs enabling of equalization may also be determined according to other parameter information of the battery pack. For example, when the battery equalization system performs equalization processing on the cell in an active equalization manner, that is, charges the cell that needs enabling of equalization, the greatest voltage value among the voltage values of the cells in the battery pack is used as a reference voltage value.

Optionally, when the controller 14 determines, according to the parameter information of the cell 111 in the battery pack 11, that a cell 111 in the battery pack 11 needs enabling of equalization, for example, according to the voltage value of the cell 111 that needs enabling of equalization and the reference voltage value, obtains a target equalization duration of the cell 111 that needs enabling of equalization, and according to the target equalization duration of the cell 111 that needs enabling of equalization, controls the equalization circuit 13 to perform equalization processing on the cell 111 that needs enabling of equalization.

Further, the controller 14 controls, according to the target equalization duration and an equalization duty cycle, the equalization circuit 13 to perform equalization processing on the cell 111 that needs enabling of equalization. The equalization duty cycle is a ratio of an equalization period of the cell 111 that needs enabling of equalization to a unit cycle. The unit cycle includes the equalization period and a collection period. In the collection period, the collection circuit 12 collects the parameter information of the battery pack 11; and in the equalization period, the equalization circuit 13 performs equalization processing on the cell 111 to be equalized in the battery pack 11.

For example, as shown in FIG. 1 and FIG. 2, the collection circuit 12 may determine that the smallest voltage value among the voltage values of the cells 111 in the battery pack 11 is the reference voltage value, and the preset voltage difference threshold may be 5 mV (or another value). First, the controller 14 obtains the smallest voltage value Vmin among the cells 111 through comparison, and determines whether the difference between the voltage value of each cell 111 in the battery pack 11 and Vmin is less than 5 mV. If the difference is less than 5 mV, the battery pack 11 is very consistent in equalization and needs no more equalization; if the difference is greater than 5 mV, the cell 111 with a difference between its voltage value and Vmin being greater than 5 mV is used as the cell 111 that needs enabling of equalization. At this time, if the vehicle is in the OFF gear, the vehicle body controller 31 controls the second power supply branch circuit 16 to stay in a connected state. Further, the storage battery 33 can supply power to the controller 14 through the second power supply branch circuit 16. Subsequently, the controller 14 controls the equalization circuit 13 to discharge the cell 111 that needs enabling of equalization. After the second power supply branch circuit 16 is connected, the vehicle body controller 31 controls the first power supply branch circuit 15 to stay in a disconnected state so that the load 32 is powered off.

In the discharging process, the controller 14 may keep reading voltage information of the cell 111 that needs enabling of equalization, and determine whether the difference between Vmin and the voltage of the cell is less than 5 mV. If the difference is less than 5 mV, the discharge stops, and the equalization is ended. The vehicle body controller 31 controls the second power supply branch circuit 16 to stay in the disconnected state, so that the controller 14 is powered off. If the difference is still greater than 5 mV, the vehicle body controller continues to cyclically read the voltage information of the cell 111 that needs enabling of equalization until the difference between Vmin and the voltage of the cell is less than 5 mV. Thereafter the discharge stops, and the equalization is ended. The vehicle body controller 31 controls the second power supply branch circuit 16 to stay in the disconnected state, so that the controller 14 is powered off.

After the cell 111 that needs enabling of equalization is determined, a target equalization duration of the cell 111 that needs enabling of equalization may also be calculated according to the voltage value of the cell 111 that needs enabling of equalization and Vmin. Further, after the discharge starts, a discharge duration of the cell 111 that needs enabling of equalization is counted. When the difference between the charge duration of the cell 111 and the target equalization duration falls within a threshold range, the discharge stops, and the equalization ends. The vehicle body controller 31 controls the second power supply branch circuit 16 to stay in the disconnected state, so that the controller 14 is powered off.

The present application improves the electrical connection structure of the battery equalization system. When the entire vehicle is in the OFF gear and a cell in the battery pack needs enabling of equalization, by controlling the second power supply branch circuit serving as a standby power supply branch circuit to stay in the connected state, the present application enables the storage battery to supply power to the controller when the entire vehicle is in the OFF gear. Further, the controller can continue to control the equalization circuit to perform equalization processing on the cell that needs enabling of equalization, thereby extending the battery equalization time, improving the battery equalization effect, and resolving the technical problem of low equalization efficiency of the battery equalization system in the related art.

Referring to FIG. 2, a second switch 162 and a first switch 151 that is controlled by the vehicle body controller 31 are disposed on the second power supply branch circuit 16 and the first power supply branch circuit 15 respectively. The two sides of the second switch 162 are respectively connected to the storage battery 33 and the controller 14. One side of the first switch 151 is connected to the storage battery 33, and the other side of the first switch 151 is connected to the controller 14 and a load 33.

In FIG. 2, the second switch 162 is controlled by the vehicle body controller 31. The first switch 151 and the second switch 162 may be relay switches. The vehicle body controller 31 controls the first switch 151 and the second switch 162 by outputting a control signal. When the vehicle is in the OFF gear and a cell needs enabling of equalization, the controller 31 transmits an equalization request to the vehicle body controller 31. After receiving the equalization request, the vehicle body controller 31 outputs a control signal to the first switch 151 and the second switch 162. After receiving the control signal, the second switch 162 changes to a connected state. That is, the second power supply branch circuit 16 gets into a connected state. After receiving the control signal, the first switch 151 changes to a disconnected state. That is, the first power supply branch circuit 15 gets into a disconnected state.

When the vehicle is in the OFF gear and after the equalization circuit 13 ends the equalization processing on the cell that needs enabling of equalization, the controller 14 transmits an equalization end request to the vehicle body controller 31 so that the vehicle body controller 31 outputs a control signal to the second switch 162 after receiving the equalization end request. After receiving the control signal, the second switch 162 changes to a disconnected state. That is, the second power supply branch circuit 16 gets into a disconnected state, and the controller 14 is powered off.

Optionally, after the vehicle is powered on, the vehicle body controller 31 controls the second switch 162 to keep connected all the time. When the vehicle is in the OFF gear and after the equalization circuit 13 ends the equalization processing on the cell that needs enabling of equalization, the vehicle body controller 31 controls the second switch 162 to disconnect, and all high-voltage components of the entire vehicle stop operating.

Figure 3:
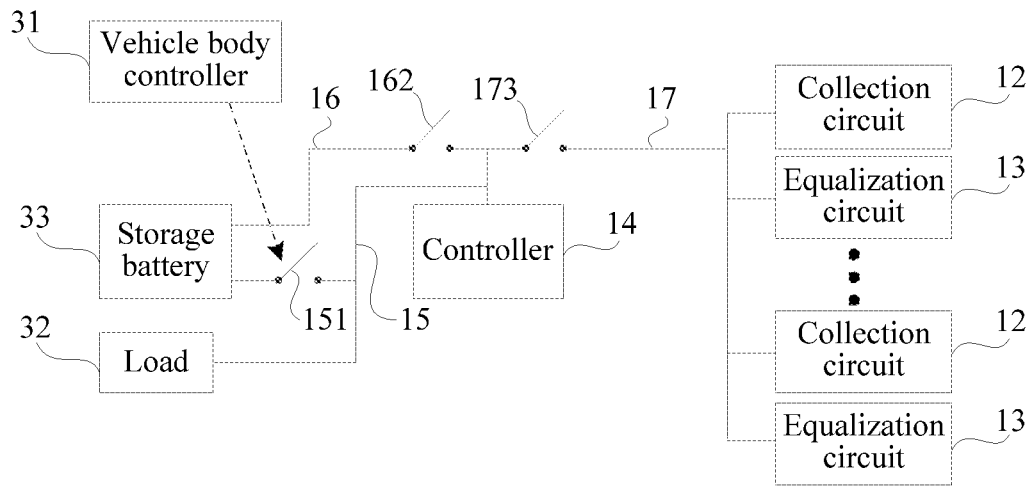
FIG. 3 is another schematic diagram of a power supply branch circuit in a battery equalization system according to an exemplary embodiment.

FIG. 3 is a schematic diagram of another power supply branch circuit in a battery equalization system according to an exemplary embodiment. In FIG. 3, the second switch 162 is controlled by the controller 14. When the vehicle is in the OFF gear and a cell needs enabling of equalization, the controller 14 outputs a control signal to the second switch 162. After receiving the control signal, the second switch 162 changes to a connected state. That is, the second power supply branch circuit 16 gets into a connected state. After the second power supply branch circuit 16 is connected, the vehicle body controller 31 controls the first switch 151 to disconnect.

When the vehicle is in the OFF gear and after the equalization circuit 13 ends the equalization processing on the cell that needs enabling of equalization, the controller 14 controls the second switch 162 to stay in a disconnected state.

Optionally, after the vehicle is powered on, the controller 14 controls the second switch 162 to keep connected all the time. When the vehicle is in the OFF gear and after the equalization circuit 13 ends the equalization processing on the cell that needs enabling of equalization, the controller 14 controls the second switch 162 to disconnect, and all high-voltage components of the entire vehicle stop operating.

In other embodiments, connection and disconnection of the first power supply branch circuit 15 and the second power supply branch circuit 16 may also be controlled by a switch, and the switch may be a single-pole double-throw switch.

As shown in FIG. 2, the battery equalization system further includes a third power supply branch circuit 17. One end of the third power supply branch circuit 17 is connected to the controller 14, and the other end of the third power supply branch circuit 17 is connected to a collection circuit 12 and the equalization circuit 13. In FIG. 2, the third power supply branch circuit 17 keeps connected. Because the third power supply branch circuit 17 keeps connected all the time, when the storage battery 33 supplies power to the controller 14 through the first power supply branch circuit 15 or the second power supply branch circuit 16, the storage battery can also supply power to the collection circuit 12 and the equalization circuit 13 through the third power supply branch circuit 17.

As shown in FIG. 3, a third switch 173 controlled by the controller 14 is disposed on the third power supply branch circuit 17. One side of the third switch 173 is connected to the controller 14, and the other side of the third switch 173 is connected to the collection circuit 12 and the equalization circuit 13. The third switch 173 keeps connected under the control of the controller 14.

Optionally, as shown in FIG. 1 and FIG. 3, when the equalization circuit 13 performs equalization processing on the cell that needs enabling of equalization, the third switch 173 changes from a connected state to a disconnected state under the control of the controller 14, so that the battery pack 11 supplies power to the equalization circuit 13 and the collection circuit 12.

As shown in FIG. 1 and FIG. 3, after determining, according to the parameter information of the cell 111 in the battery pack 11, that a cell 111 in the battery pack 11 needs enabling of equalization and determining a target equalization duration of the cell 111 that needs enabling of equalization, the controller 14 transmits an equalization instruction to the equalization circuit 13 to indicate the cell 111 that needs enabling of equalization in the battery pack 11, and the target equalization duration of the cell 111. After the equalization circuit 13 receives the equalization instruction, the third switch 173 changes from the connected state to a disconnected state under the control of the controller 14. That is, when the equalization circuit 13 performs equalization processing on the cell that needs enabling of equalization, the controller 14 controls the third switch 173 to change from the connected state to the disconnected state. Because the cell 111 in the battery pack 11 is connected to the collection circuit 12 and the equalization circuit 13 in a one-to-one correspondence, after the third switch 173 is disconnected, operating power supplies of the collection circuit 12 and the equalization circuit 13 receive power from the cell 111 in the battery pack 11, and the controller 14 operates normally.

Still referring to FIG. 1 and FIG. 3, after the third switch 173 is disconnected, the controller 14 periodically (for example, every 15 s, 20 s or at other intervals) gets into a sleep mode. In the sleep mode, the controller 14 is in an operating state with a low power consumption. When the controller 14 exits the sleep mode, the controller 14 controls the third switch 173 to get connected to obtain the parameter information of the cells 111 in the battery pack 11 and a remaining duration of equalization processing still to be performed by the equalization circuit 13 on the cell 111 that needs enabling of equalization. Further, the controller 14 may adjust, in real time, the equalization processing on the cell 111 that needs enabling of equalization.

Figure 4:
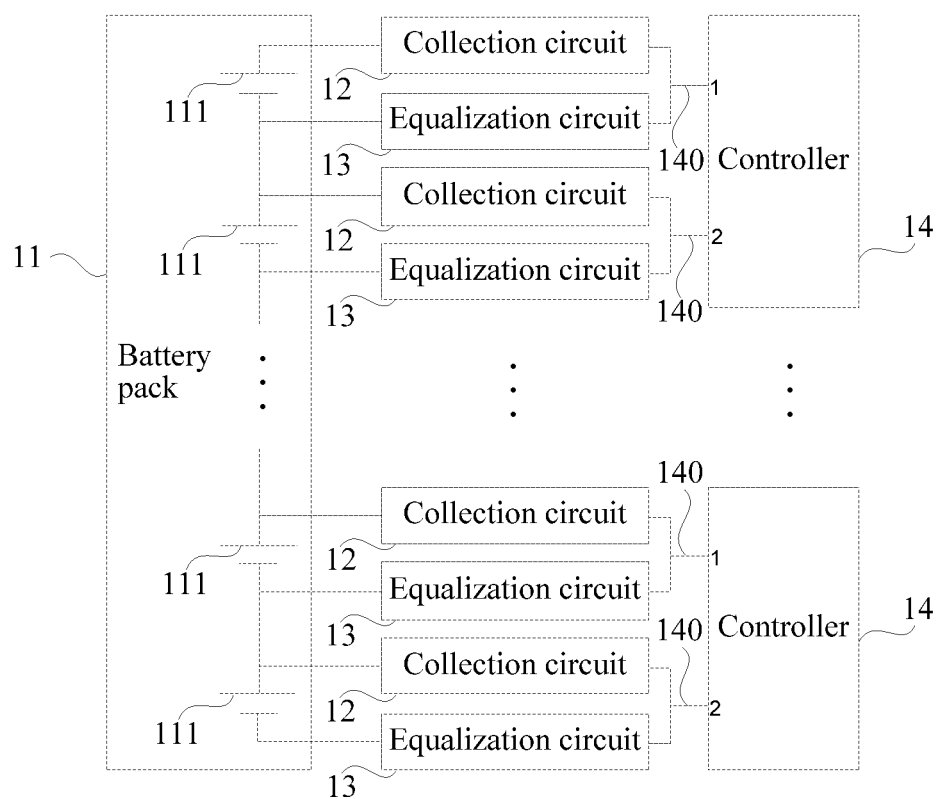
FIG. 4 is another block diagram of a battery equalization system according to an exemplary embodiment.

FIG. 4 is another block diagram of a battery equalization system according to an exemplary embodiment. As shown in FIG. 4, FIG. 3, and FIG. 2, the battery equalization system includes a collection circuit 12, an equalization circuit 13, a controller 14, a first power supply branch circuit 15, and a second power supply branch circuit 16. The battery pack 11 is multiple cells 111 connected in series. The difference from the battery equalization system in FIG. 1 lies in that the controller 14 in the battery equalization system in FIG. 4 is connected through a channel 140 to the collection circuit 12 and the equalization circuit 13 that correspond to the same cell 111.

When the controller 14 determines that the cell 111 needs no equalization, the controller 14 is connected through the channel 140 to the corresponding collection circuit 12; or, when the controller 14 determines that the cell 111 needs equalization, the collection circuit 12 and the equalization circuit 13 that correspond to the cell 111 multiplex through the channel 140 in a time division manner. That is, the control module 14 is connected through the channel 140 to the corresponding collection module 12 and equalization module 13 in a time division manner. The controller 14 includes a control chip, and the control chip is connected to each cell 111 through one pin (represented by numerals 1 and 2) to the collection circuit and the equalization circuit that correspond to the same cell 111, and for each cell the pin (e.g., pin 1 for a first cell 111, and pin 2 for a second cell 111) is connected to both the equalization circuit 13 and the collection circuit 12 for the same cell 111 through the channel 140.

Optionally, as shown in FIG. 4, the controller 14 controls, according to the target equalization duration and an equalization duty cycle, the equalization circuit 13 to perform equalization processing on the cell 111 that needs enabling of equalization, the equalization duty cycle is a ratio of an equalization period of the cell 111 that needs enabling of equalization to a unit cycle, and the unit cycle includes the equalization period and a collection period. In FIG. 4, the equalization duty cycle may also be a ratio of a duration for which the equalization circuit 13 occupies the channel 140 to a total duration for which the channel 140 is occupied. The total duration for which the channel 140 is occupied includes the duration for which the equalization circuit 13 occupies the channel 140 and a duration for which the collection circuit 12 occupies the channel 140.

As shown in FIG. 4, FIG. 3 and FIG. 2, first, the controller 14 connects the channel 140 to the collection circuit 12, and further can control the collection circuit 12 to collect the parameter information of the battery pack 11. Then, the controller 14 is configured to: when it is determined, according to the parameter information of the cell 111 in the battery pack 11, a cell 111 in the battery pack 11 needs enabling of equalization, obtain the target equalization duration and the equalization duty cycle of the cell 111 that needs enabling of equalization, and connect the channel 140 to the equalization circuit 13 corresponding to the cell 111 that needs enabling of equalization. Then, the controller 14 controls the equalization circuit 13 to connect the cell 111 that needs enabling of equalization to a power generator 30 or a storage battery 33 according to the target equalization duration and the equalization duty cycle of the cell 111 that needs enabling of equalization. That is, the controller 14 can control the connection time of the first switch 131 in FIG. 2 or the second switch 135 in FIG. 3 according to the target equalization duration and the equalization duty cycle.

Optionally, the controller 14 determines an equalization period and a collection period according to the target equalization duration and the equalization duty cycle. A sum of the equalization period and the collection period is equal to the total duration for which the channel 140 is occupied. In the collection period, the channel 140 is connected to the collection circuit 12, so that the collection circuit 12 collects the parameter information of the battery pack 11. In the equalization period, the channel 140 is connected to the equalization circuit 13 that needs to perform equalization processing, and the equalization circuit 13 is connected, so that the equalization circuit 13 performs equalization processing on the cell 111 to be equalized in the battery pack 11.

Because the controller in the present application multiplexes one channel in a time division manner with a voltage sampling circuit of each cell and the equalization circuit, the required quantity of channels of the controller is reduced, and hardware cost is reduced. In addition, because battery sampling is separated from equalization, equalization of current does not affect the battery voltage, thereby improving precision of battery voltage sampling.

Figure 10:
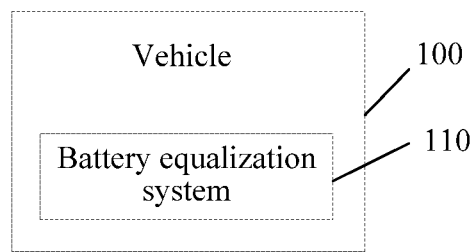
FIG. 10 is a block diagram of a vehicle according to an exemplary embodiment.

The present application further provides a vehicle 100. As shown in FIG. 10, the vehicle includes the battery equalization system 110 described above. Specific operation manners of each circuit have been described in detail in the embodiments related to the system, and will not be described in detail here.

Figure 5:
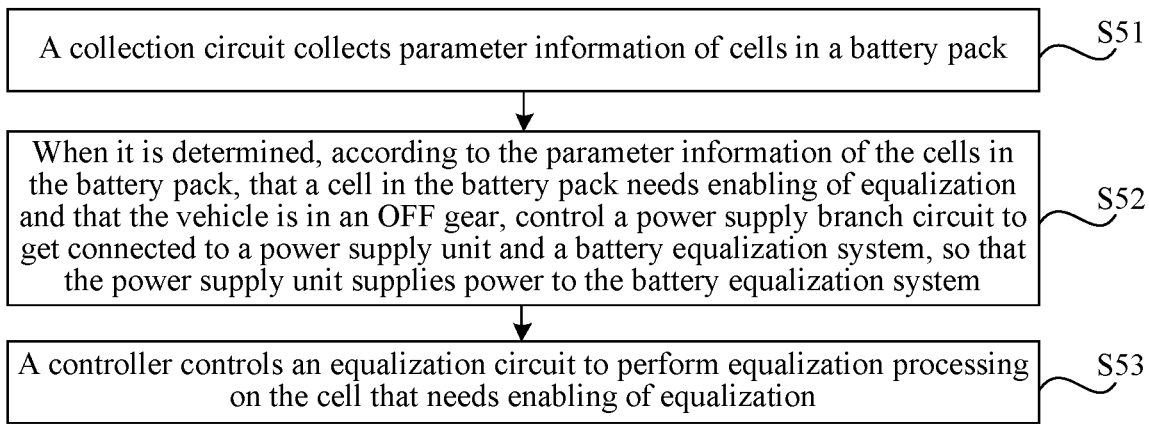
FIG. 5 is a flowchart of a battery equalization method according to an exemplary embodiment.

FIG. 5 is a flowchart of a battery equalization method according to an exemplary embodiment. As shown in FIG. 5, the battery equalization method is applied to a vehicle including the battery equalization system, and the method includes the following steps:

Step S51: A collection circuit collects parameter information of cells in a battery pack;

Step S52: When it is determined, according to the parameter information of the cells in the battery pack, that a cell in the battery pack needs enabling of equalization and that the vehicle is in an OFF gear, control a power supply branch circuit to get connected to a power supply unit and the battery equalization system, so that the power supply unit supplies power to the battery equalization system; and Step S53: A controller controls an equalization circuit to perform equalization processing on the cell that needs enabling of equalization.

Optionally, the battery equalization system further includes a first power supply branch circuit connected to the power supply unit and the battery equalization system, and a second power supply branch circuit connected to the power supply unit and the battery equalization system.

The controlling a power supply branch circuit to get connected to a power supply unit and the battery equalization system includes:

controlling the second power supply branch circuit to stay in a connected state; and changing, by a vehicle body controller after the second power supply branch circuit is connected, the first power supply branch circuit from a connected state to a disconnected state.

Figure 6:
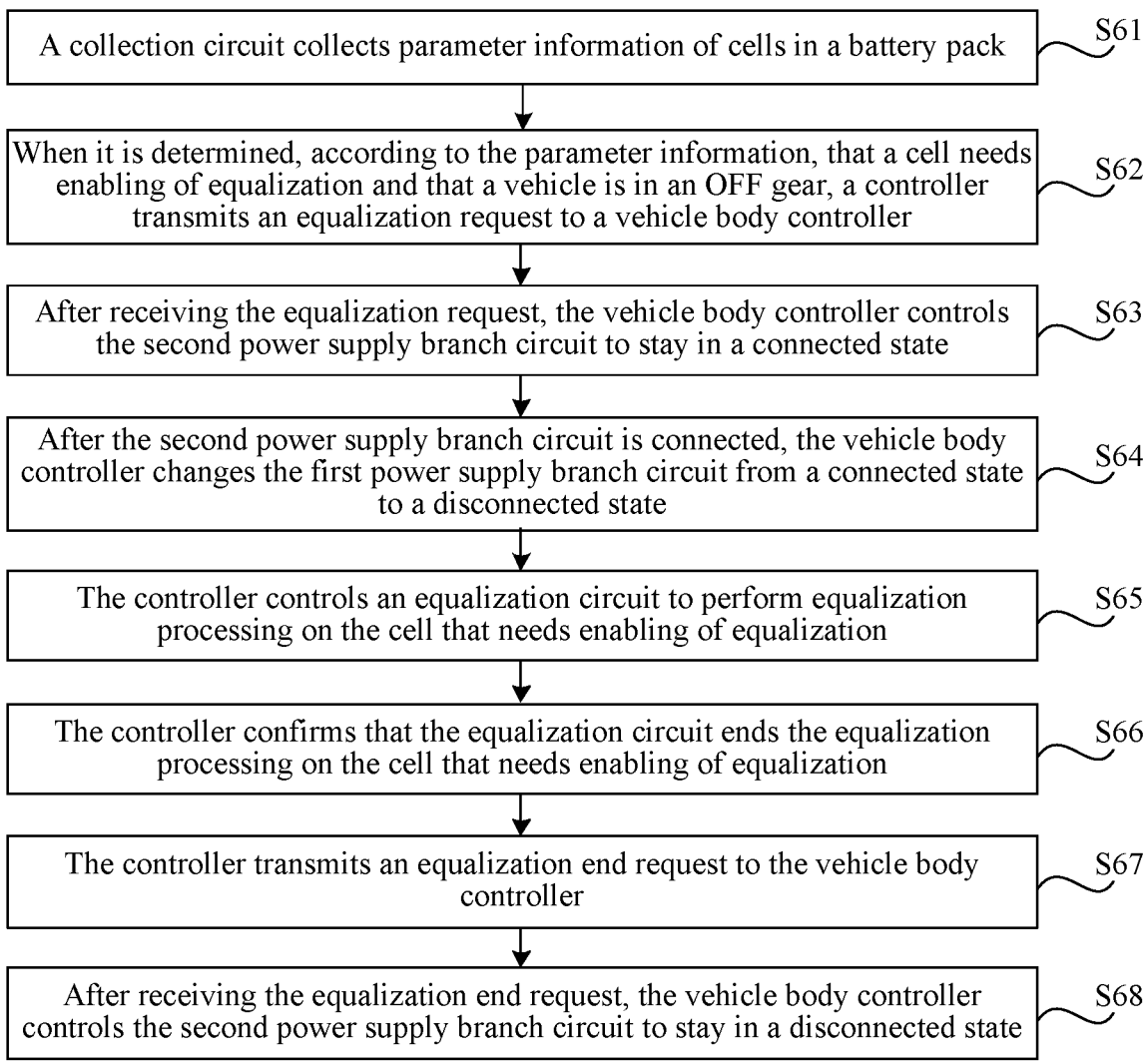
FIG. 6 is another flowchart of a battery equalization method according to an exemplary embodiment.

FIG. 6 is another flowchart of a battery equalization method according to an exemplary embodiment. As shown in FIG. 6, the method includes the following steps:

Step S61: A collection circuit collects parameter information of cells in a battery pack;

Step S62: When it is determined, according to the parameter information of cells in a battery pack, that a cell in the battery pack needs enabling of equalization and that the vehicle is in an OFF gear, a controller transmits an equalization request to a vehicle body controller;

Step S63: After receiving the equalization request, the vehicle body controller controls the second power supply branch circuit to stay in a connected state;

Step S64: After the second power supply branch circuit is connected, the vehicle body controller changes the first power supply branch circuit from a connected state to a disconnected state;

Step S65: The controller controls an equalization circuit to perform equalization processing on the cell that needs enabling of equalization;

Step S66: The controller confirms that the equalization circuit ends the equalization processing on the cell that needs enabling of equalization;

Step S67: The controller transmits an equalization end request to the vehicle body controller; and Step S68: After receiving the equalization end request, the vehicle body controller controls the second power supply branch circuit to stay in a disconnected state.

Figure 7:
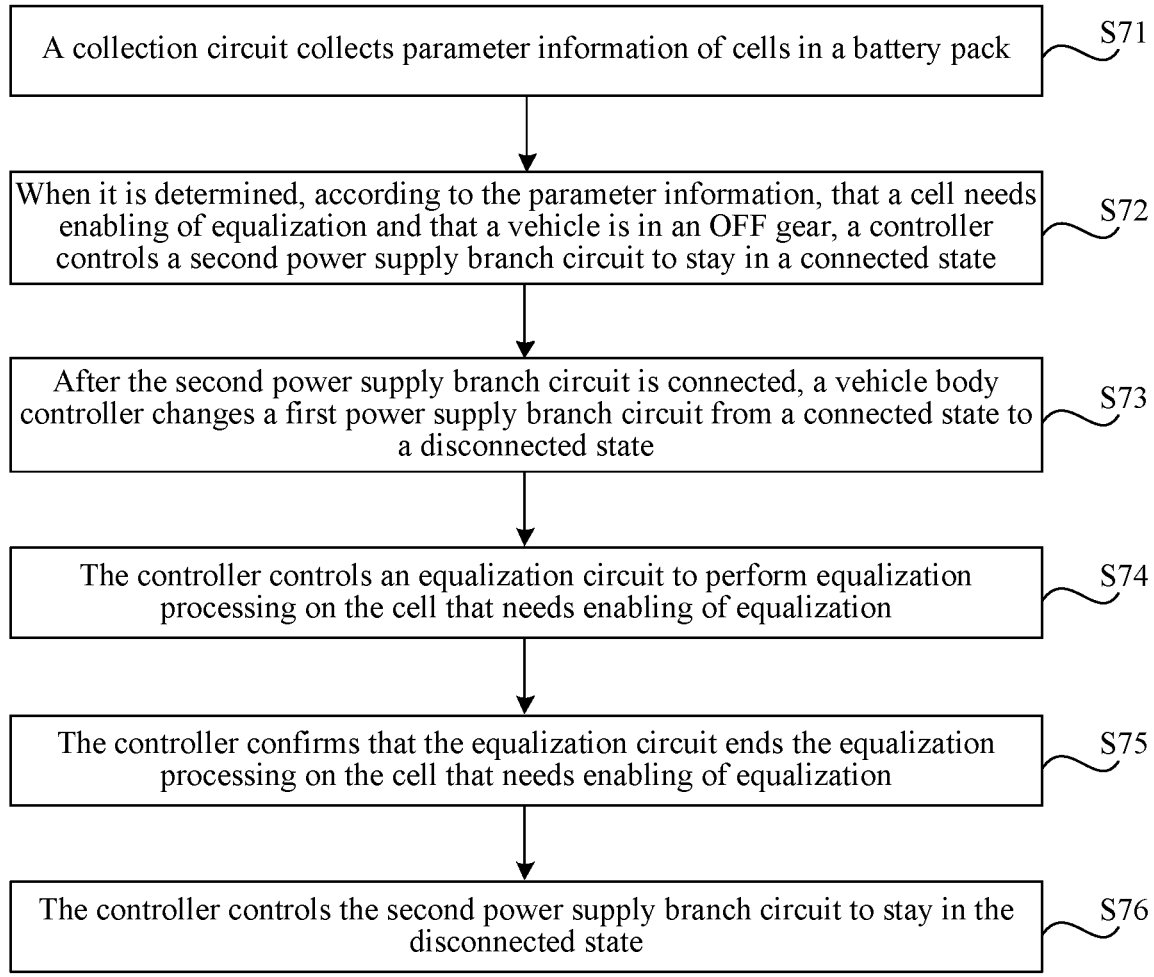
FIG. 7 is another flowchart of a battery equalization method according to an exemplary embodiment.

FIG. 7 is another flowchart of a battery equalization method according to an exemplary embodiment. As shown in FIG. 7, the method includes the following steps:

Step S71: A collection circuit collects parameter information of cells in a battery pack;

Step S72: When it is determined, according to the parameter information of cells in a battery pack, that a cell in the battery pack needs enabling of equalization and that the vehicle is in an OFF gear, a controller controls a second power supply branch circuit to stay in a connected state;

Step S73: After the second power supply branch circuit is connected, the vehicle body controller changes the first power supply branch circuit from a connected state to a disconnected state;

Step S74: A controller controls an equalization circuit to perform equalization processing on the cell that needs enabling of equalization;

Step S75: The controller confirms that the equalization circuit ends the equalization processing on the cell that needs enabling of equalization; and Step S76: The controller controls the second power supply branch circuit to stay in the disconnected state.

Optionally, after the vehicle is powered on, the second switch is controlled to stay in the connected state.

Figure 8:
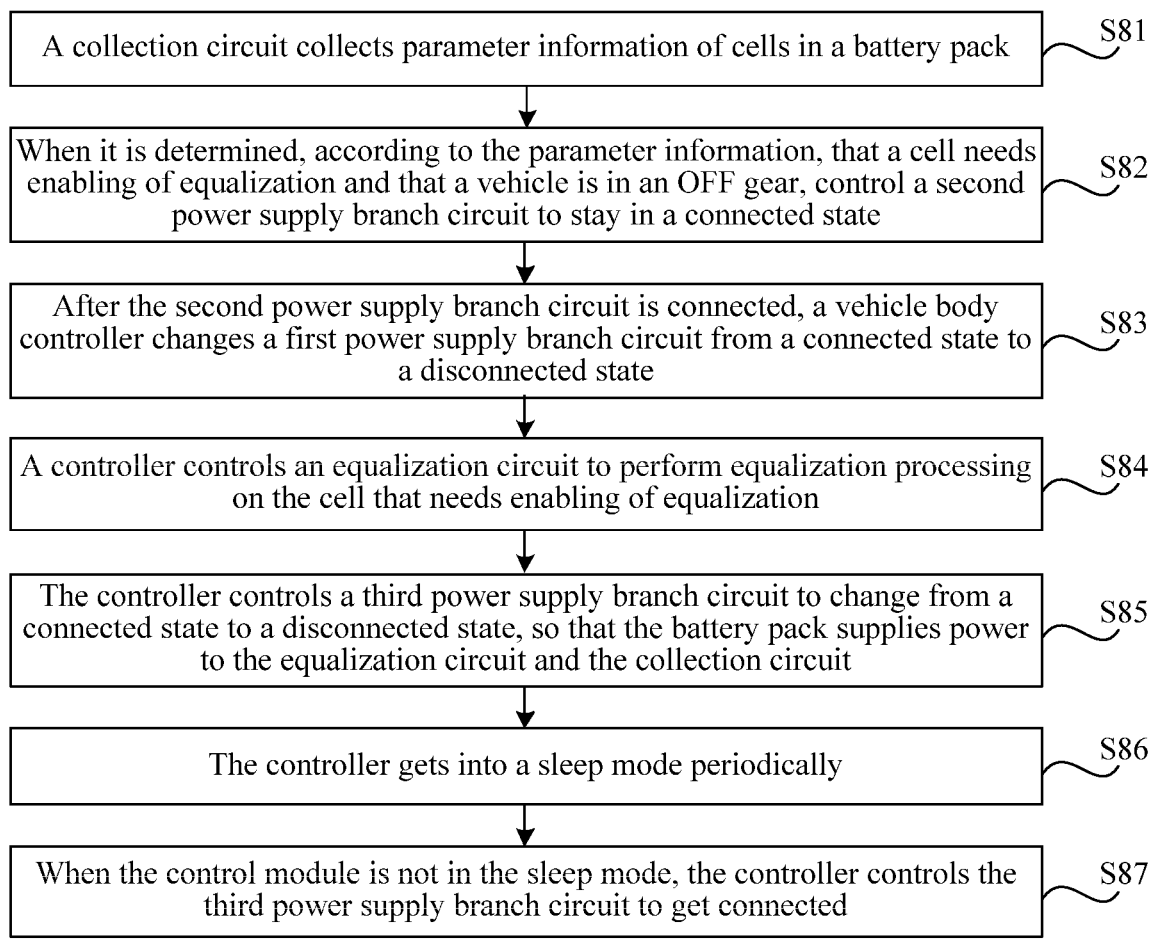
FIG. 8 is another flowchart of a battery equalization method according to an exemplary embodiment.

FIG. 8 is another flowchart of a battery equalization method according to an exemplary embodiment. As shown in FIG. 8, the battery equalization system further includes a third power supply branch circuit. One end of the third power supply branch circuit is connected to the controller, and the other end of the third power supply branch circuit is connected to a collection circuit and the equalization circuit. The method includes the following steps:

Step S81: A collection circuit collects parameter information of cells in a battery pack;

Step S82: When it is determined, according to the parameter information of cells in a battery pack, that a cell in the battery pack needs enabling of equalization and that the vehicle is in an OFF gear, control a second power supply branch circuit to stay in a connected state.

Step S83: After the second power supply branch circuit is connected, the vehicle body controller changes the first power supply branch circuit from a connected state to a disconnected state;

Step S84: The controller controls an equalization circuit to perform equalization processing on the cell that needs enabling of equalization;

Step S85: The controller controls the third power supply branch circuit to change from a connected state to a disconnected state, so that the battery pack supplies power to the equalization circuit and the collection circuit;

Step S86: The controller gets into a sleep mode periodically; and

Step S87: When the controller exits the sleep mode, the controller controls the third power supply branch circuit to get connected to obtain the parameter information of the cells in the battery pack and a remaining duration of equalization processing still to be performed by the equalization circuit on the cell that needs enabling of equalization.

Optionally, when the equalization circuit performs equalization processing on the cell that needs enabling of equalization, the controller controls the third power supply branch circuit to keep connected.

Figure 9:
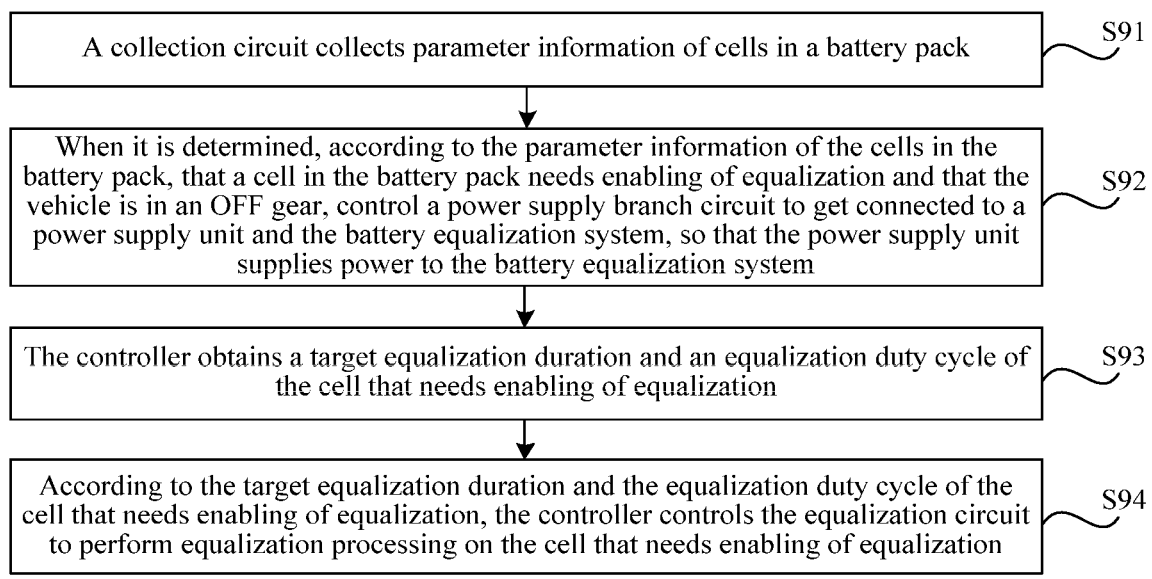
FIG. 9 is another flowchart of a battery equalization method according to an exemplary embodiment.

FIG. 9 is another flowchart of a battery equalization method according to an exemplary embodiment. As shown in FIG. 9, the controller is connected through one channel to the collection circuit and the equalization circuit that correspond to a same cell, and the collection circuit and the equalization circuit multiplex the channel in a time division manner. The method includes the following steps:

Step S91: A collection circuit collects parameter information of cells in a battery pack;

Step S92: When it is determined, according to the parameter information of the cells in the battery pack, that a cell in the battery pack needs enabling of equalization and that the vehicle is in an OFF gear, control a power supply branch circuit to get connected to a power supply unit and the battery equalization system, so that the power supply unit supplies power to the battery equalization system;

Step S93: The controller obtains a target equalization duration and an equalization duty cycle of the cell that needs enabling of equalization, where the equalization duty cycle is a ratio of an equalization period of the cell that needs enabling of equalization to a unit cycle, and the unit cycle includes the equalization period and a collection period; and Step S94: According to the target equalization duration and the equalization duty cycle of the cell that needs enabling of equalization, the controller controls the equalization circuit to perform equalization processing on the cell that needs enabling of equalization.

Detailed implementation of each step in the battery equalization method in the foregoing embodiment has been described in detail in the embodiment related to the battery equalization system, and will not be described in detail here.

The present application further provides a computer-readable storage medium, on which a computer program instruction is stored. When executed by a processor, the program instruction implements the battery equalization method.

The preferred implementations of the present application have been described in detail above with reference to the accompanying drawings, but the present application is not limited to the specific details in the above implementations. Various simple variations can be made to the technical solutions of the present application within the scope of the technical idea of the present application, and such simple variations shall fall within the protection scope of the present application.

In addition, it should be noted that, the specific technical features described in the foregoing specific implementations may be combined in any appropriate manner without conflict. To avoid unnecessary repetition, various possible combinations are not described in this application.

In addition, various implementations of the present application may be combined without violating the idea of the present application, and such combinations shall also be regarded as the content disclosed in the present application.

What is claimed is:

1. A battery equalization system, comprising:
a collection circuit, configured to collect parameter information of cells in a battery pack;
an equalization circuit, configured to perform equalization processing on the cells in the battery pack;
a controller, connected to the collection circuit and the equalization circuit separately, and configured to determine, according to the parameter information of the cells in the battery pack, whether there is a cell in the battery pack needs enabling of equalization, and to control, when it is determined that a cell in the battery pack needs enabling of equalization, the equalization circuit to perform the equalization processing on the cell that needs enabling of equalization; wherein the controller is connected to the collection circuit and the equalization circuit corresponding to the cell that needs enabling of equalization through one channel, and the collection circuit and the equalization circuit are configured to multiplex the channel in a time division manner such that collection of parameter information of the cell that needs enabling of equalization is separated from the equalization processing of the cell that needs enabling of equalization; wherein a process of enabling of equalization comprises:

detecting a first cell of the cells with a smallest voltage value, detecting a second cell of the cells with a voltage value greater than the smallest voltage value, calculating a voltage difference for the second cell by subtracting the voltage value by the smallest voltage value, determining the voltage difference is greater than or equal to a preset voltage difference threshold, and performing the equalization processing on the second cell until the voltage difference is less than the preset voltage difference threshold;

a power supply branch circuit, controlled by the controller to connect a power supply unit to the battery equalization system when the battery pack stops charging or discharging and a cell needs enabling of equalization, so that the power supply unit supplies power to the battery equalization system; wherein the power supply branch circuit comprises:

a first power supply branch circuit connected to the power supply unit and the battery equalization system; the first power supply branch circuit is configured to supply power to the battery equalization system and loads of a vehicle except the battery equalization system; and a second power supply branch circuit connected to the power supply unit and the battery equalization system; the second power supply branch circuit is configured to supply power to the battery equalization system;

the second power supply branch circuit is in a connected state, and the first power supply branch circuit is in a disconnected state under the control of a vehicle body controller when the battery pack stops charging or discharging and the cell needs enabling of equalization.

2. The battery equalization system of claim 1, wherein a connection and a disconnection of the first power supply branch circuit and the second power supply branch circuit are controlled by a switch.

3. The battery equalization system of claim 1, wherein a second switch and a first switch controlled by the vehicle body controller are separately disposed on the second power supply branch circuit and the first power supply branch circuit; two sides of the second switch are respectively connected to the power supply unit and the controller; one side of the first switch is connected to the power supply unit, and the other side of the first switch is connected to the controller and the loads.

4. The battery equalization system of claim 3, wherein the second switch is controlled by the vehicle body controller; when the battery pack stops charging or discharging and a cell needs enabling of equalization, the controller is configured to transmit an equalization request to the vehicle body controller so that the vehicle body controller controls the second switch and the first switch to stay in a connected state and a disconnected state respectively.

5. The battery equalization system of claim 4, wherein when the battery pack stops charging or discharging and after the equalization circuit ends the equalization processing on the cells that need enabling of equalization, the controller is configured to transmit an equalization end request to the vehicle body controller so that the vehicle body controller controls the second switch to stay in a disconnected state.

6. The battery equalization system of claim 3, wherein the second switch is controlled by the controller; when the battery pack stops charging or discharging and a cell needs enabling of equalization, the controller is configured to control the second switch to get connected, and after the second power supply branch circuit is connected, the vehicle body controller controls the first switch to be disconnected.

7. The battery equalization system of claim 6, wherein when the battery pack stops charging or discharging and after the equalization circuit ends the equalization processing on the cell that needs enabling of equalization, the controller is configured to control the second switch to stay in a disconnected state.

8. The battery equalization system of claim 3, wherein after the vehicle is powered on, the second switch is in a connected state under the control of the controller or the vehicle body controller.

9. The battery equalization system of claim 1, further comprising a third power supply branch circuit; wherein one end of the third power supply branch circuit is connected to the controller, and the other end of the third power supply branch circuit is connected to the collection circuit and the equalization circuit.

10. The battery equalization system of claim 1, wherein the controller comprises a control chip, the control chip is connected to the collection circuit and the equalization circuit corresponding to the cell that needs enabling of equalization through one pin; and the pin is connected to the equalization circuit and the collection circuit through the one channel.

11. The battery equalization system of claim 1, wherein the controller is further configured to, when it is determined, according to the parameter information of the battery pack, that a cell in the battery pack needs enabling of equalization, obtain a target equalization duration of the cell that needs enabling of equalization, and control, according to the target equalization duration of the cell that needs enabling of equalization, the equalization circuit to discharge the cell that needs enabling of equalization.

12. A vehicle, comprising a battery equalization system of claim 1.

13. A battery equalization method, to be implemented in a vehicle including the battery equalization system of claim 1, comprising:

collecting, by the collection circuit, the parameter information of the cells in the battery pack;

controlling, when it is determined, according to the parameter information of the cells in the battery pack, that the cell in the battery pack needs enabling of equalization and that the battery pack stops charging or discharging, the power supply branch circuit to get connected to the power supply unit and the battery equalization system, so that the power supply unit supplies power to the battery equalization system; and controlling, by the controller, the equalization circuit to perform the equalization processing on the cell that needs enabling of equalization.

14. The method of claim 13, wherein the controlling the power supply branch circuit to get connected to the power supply unit and the battery equalization system comprises:

controlling the second power supply branch to stay in a connected state; and changing, by the vehicle body controller after the second power supply branch circuit is connected, the first power supply branch circuit from a connected state to a disconnected state.

15. The method of claim 14, wherein the controlling the second power supply branch circuit to stay in the connected state comprises:

transmitting, by the controller, an equalization request to the vehicle body controller; and controlling, by the vehicle body controller after receiving the equalization request, the second power supply branch circuit to stay in the connected state.

16. The method of claim 15, further comprising:

confirming, by the controller, that the equalization circuit ends the equalization processing on the cell that needs enabling of equalization;

transmitting, by the controller, an equalization end request to the vehicle body controller; and controlling, by the vehicle body controller after receiving the equalization end request, the second power supply branch circuit to stay in a disconnected state.

* * * * *